United States Patent
Li et al.

(10) Patent No.: US 11,494,627 B1
(45) Date of Patent: Nov. 8, 2022

(54) DYNAMIC TILE PARALLEL NEURAL NETWORK ACCELERATOR

(71) Applicant: Hong Kong Applied Science and Technology Research Institute Company, Limited, Hong Kong (HK)

(72) Inventors: Tao Li, Hong Kong (HK); Xiaoqing Shan, Hong Kong (HK); Ka Lung Tim Wong, Hong Kong (HK); Xuejiao Liu, Shenzhen (CN); Yu Liu, Shenzhen (CN)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/370,171

(22) Filed: Jul. 8, 2021

(51) Int. Cl.
  *G06N 3/063* (2006.01)
  *G06N 3/04* (2006.01)
  *G06F 5/01* (2006.01)
  *G06F 7/50* (2006.01)
  *G06F 7/523* (2006.01)
  *G06F 9/50* (2006.01)

(52) U.S. Cl.
  CPC .............. *G06N 3/063* (2013.01); *G06F 5/01* (2013.01); *G06F 7/50* (2013.01); *G06F 7/523* (2013.01); *G06F 9/5027* (2013.01); *G06N 3/0481* (2013.01)

(58) Field of Classification Search
  CPC ........ G06N 3/04; G06N 3/0481; G06N 3/063; G06N 20/00; G06N 20/10; G06F 17/15; G06F 17/153; G06F 17/16; G06F 7/50; G06F 7/523; G06F 5/01; G06F 9/5027
  See application file for complete search history.

(56) References Cited

U.S. PATENT DOCUMENTS

| | | | |
|---|---|---|---|
| 8,442,927 | B2 | 5/2013 | Chakradhar et al. |
| 10,949,380 | B2 | 3/2021 | Nam |
| 2015/0310311 | A1 | 10/2015 | Shi et al. |

(Continued)

OTHER PUBLICATIONS

A. Chaudhuri et al., C-Testing of AI Accelerators, IEEE 2020 (Year: 2020).*

(Continued)

*Primary Examiner* — Emily E Larocque
(74) *Attorney, Agent, or Firm* — Stuart T. Auvinen; gPatent LLC

(57) ABSTRACT

A dynamic-tile neural network accelerator allows for the number and size of computational tiles to be re-configured. Each sub-array of computational cells has edge cells on the left-most column that have an added vector mux that feeds the cell output back to an adder-comparator to allow Rectified Linear Unit (ReLU) and pooling operations that combine outputs shifted in from other cells. The edge cells drive external output registers and receive external weights. The weights and outputs are shifted in opposite directions horizontally between cells while control and input data are shifted in a same direction vertically between cells. A column of row data selectors is inserted between sub-arrays to bypass weights and output data around sub-arrays, while a row of column data selectors are inserted between sub-arrays to bypass control and input data. Larger tiles are configured by passing data directly through these selectors without bypassing.

20 Claims, 12 Drawing Sheets

(56) References Cited

U.S. PATENT DOCUMENTS

| | | |
|---|---|---|
| 2016/0267111 A1 | 9/2016 | Shoaib et al. |
| 2019/0079801 A1 | 3/2019 | Lyuh et al. |
| 2019/0244086 A1 | 8/2019 | Franca-Neto |
| 2019/0286944 A1 | 9/2019 | Thorpe et al. |
| 2020/0089506 A1 | 3/2020 | Power et al. |
| 2020/0134417 A1* | 4/2020 | Mohapatra ............ G06N 3/0454 |
| 2020/0150958 A1* | 5/2020 | Ahmed ............... G06F 9/30145 |
| 2020/0159809 A1 | 5/2020 | Catthoor et al. |
| 2020/0410337 A1 | 12/2020 | Huang et al. |
| 2021/0182186 A1* | 6/2021 | Lew ....................... G06N 3/063 |

OTHER PUBLICATIONS

H. Mo et al., TFE: Energy-efficient transferred Filter-based Engine to Compress and Accelerate Convolutional Neural Networks, 2020 53rd Annual IEEE/ACM International Symposium on Microarchitecture (MICRO), IEEE 2020 (Year: 2020).*

ISR and Written Opinion, PCT/CN2021/105851, dated Apr. 14, 2022.

\* cited by examiner

8X4 TILE SIZE, 2 TILES

4X8 TILE SIZE, 2 TILES

| | CELL 12-1 | CELL 10-2 | CELL 10-3 | CELL 10-4 |
|---|---|---|---|---|
| TIME T0 | CTL: CLEAR<br>IN: A01  WGT:W01 | | | |
| TIME T0+1 | CTL: CMP_EN=1'B0<br>IN: A02  WGT:W02<br>ACCREG: A01 x W01 | CTL: CLEAR<br>IN: A11  WGT:W01 | | |
| TIME T0+2 | IN: A03  WGT:W03<br>ACCREG: A01 x W01<br>+ A02 x W02 | CTL: CMP_EN=1'B0<br>IN: A12  WGT:W02<br>ACCREG: A11 x W01 | CTL: CLEAR<br>IN: A21  WGT:W01 | |
| TIME T0+3 | IN: A04  WGT:W04<br>ACCREG: A01 x W01 +<br>A02 x W02 + A03 x W03 | IN: A13  WGT:W03<br>ACCREG: A11 x W01<br>+ A12 x W02 | CTL: CMP_EN=1'B0<br>IN: A22  WGT:W02<br>ACCREG: A21 x W01 | CTL: CLEAR<br>IN: A31  WGT:W01 |

FIG. 9A

CONVOLUTION

|  | CELL 12-1 | CELL 10-2 | CELL 10-3 | CELL 10-4 |
|---|---|---|---|---|
| TIME T0+N | CTL: CMP_EN=1'B1<br>RELU(O01)<br>OUT: RELU(O01) | OUT: O02 | OUT: O03 | OUT: O04 |
| TIME T0+N+1 | LEFT SHIFT<br>OUT: O02 | LEFT SHIFT<br>OUT: O03 | LEFT SHIFT<br>OUT: O04 | LEFT SHIFT<br>OUT: XX |
| TIME T0+N+2 | CTL: CMP_EN=1'B1<br>RELU(O02)<br>OUT: RELU(O02) | OUT: O03 | OUT: XX | OUT: XX |
| TIME T0+N+3 | LEFT SHIFT<br>OUT: O03 | LEFT SHIFT<br>OUT: O03 | LEFT SHIFT<br>OUT: XX | LEFT SHIFT<br>OUT: XX |

RELU (1'B1)

FIG. 9B

| | CELL 12-1 | CELL 10-2 | CELL 10-3 | CELL 10-4 |
|---|---|---|---|---|
| TIME T0+N | CTL: CMP_EN=1'B1<br>RELU_MAX(O01)<br>OUT: RELU_MAX(O01) | OUT: O02 | OUT: O03 | OUT: O04 |
| TIME T0+N+1 | LEFT SHIFT<br>OUT: O02 | LEFT SHIFT<br>OUT: O03 | LEFT SHIFT<br>OUT: O04 | LEFT SHIFT<br>OUT: XX |
| TIME T0+N+2 | CTL: CMP_EN=1'B1<br>RELU_MAX(O02)<br>OUT: RELU_MAX(O02) | OUT: O03 | OUT: XX | OUT: XX |
| TIME T0+N+3 | LEFT SHIFT<br>OUT: O03 | LEFT SHIFT<br>OUT: O03 | LEFT SHIFT<br>OUT: XX | LEFT SHIFT<br>OUT: XX |

RELU, MAX POOLING (1'B1)

FIG. 10

DYNAMIC TILE PARALLEL NEURAL NETWORK ACCELERATOR

FIELD OF THE INVENTION

This invention relates to neural network accelerators, and more particularly to dynamic tiles in neural network accelerators.

BACKGROUND OF THE INVENTION

Many complex problems may be solved using Artificial Intelligence (AI) rather than traditional programs. Deep learning is often required for the more complex applications.

Hardware accelerators specific to AI have become available. Deep Neural Network (DNN) accelerators use many parallel computational engines to accelerate deep learning AI applications. However, each of these engines may be fairly large which increases the data transfer latency. The fixed size of each computational engine can result in low efficiency for some workloads especially when many convolution layers are used. The parallel, fixed hardware may not match the computational problem, resulting in unused engines and inefficient utilization. Multiplication-Accumulator (MAC) efficiency for the parallel computation engines may suffer.

Many techniques to improve deep neural networks have been proposed. Control flow schemes using switch mapping or multiple-level task scheduling have fixed configurations and may not improve MAC utilization. Data flow schemes that broadcast data or provide activation sharing likewise have fixed configurations and may not improve MAC utilization. Multi-function and Single-Instruction Multiple Data (SIMD) systems can have complex cell designs that increase silicon area. Even 3D rather than 2D arrays have been proposed, but these still have fixed configurations.

What is desired is a neural network accelerator with parallel processing engines that are re-configurable into tiles of various sizes. It is desired to provide dynamic tile sizing in a neural network accelerator to maximize MAC utilization. It is further desired to add direct paths to reduce data-transfer latency. It is further desires to minimize data transfer latency with multi-functional computation cells.

BRIEF DESCRIPTION OF THE DRAWINGS

FIGS. 9A-9B highlight the timing of the convolution and ReLU operations of FIGS. 8A-8B.

FIG. 10 shows the timing of the convolution and ReLU with pooling.

DETAILED DESCRIPTION

The present invention relates to an improvement in neural network accelerators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
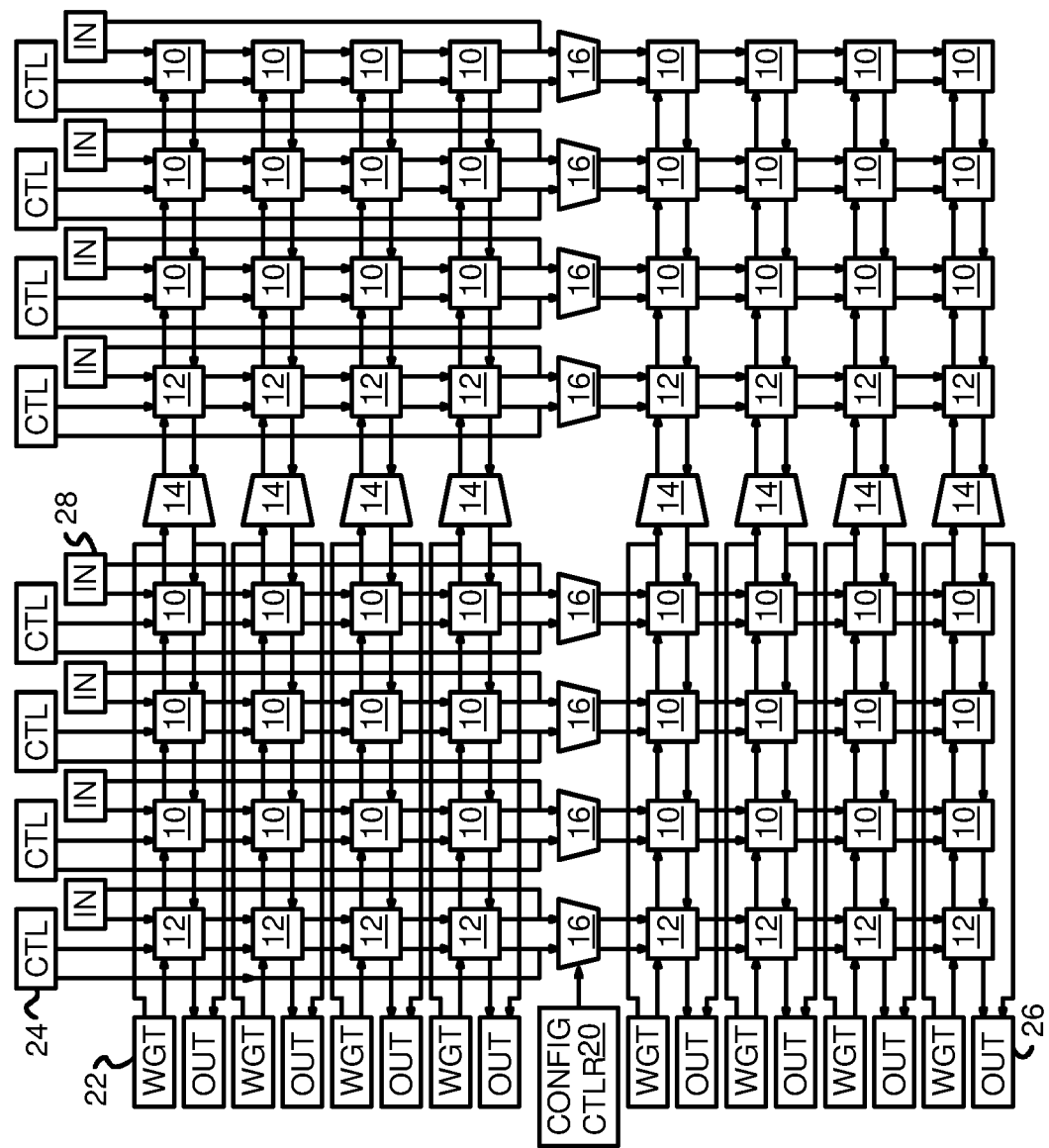
FIG. 1 is a block diagram of a neural network accelerator with dynamic tiling.

FIG. 1 is a block diagram of a neural network accelerator with dynamic tiling. An array of processing engines is formed by computational cells 10 and edge cells 12. Computational cells 10 can perform both 2D multiplication, while edge cells 12 can perform both 2D multiplication and vector processing. Edge cell 12 has the all the functionality of computational cell 10 but can also perform vector operations.

In this example, the array of cells is divided into 4 sub-arrays, each sub-array being a 4×4 array of cells. The left or first column of cells is composed of edge cells 12, while the remaining 3 columns of cells is composed of computational cells 10. Thus edge cells 12 form the left edge of the 4×4 sub-array.

Input data from input registers 28 and control information from control registers 24 are located at the top of the array and feed data and control information down into the array of computational cells 10 and edge cells 12.

Weights from weight registers 22 are located at the left of the array and feed weights to the right into the array of computational cells 10 and edge cells 12.

Rather than have output registers on the right of the array, the inventors place output registers 26 on the left of the array, on the same side as weight registers 22. Having output registers 26 on the left of the array allows activation units to be re-used, because when output registers 26 are on the left, outputs can be sent one by one, therefore there is no need for extra activation unit hardware resources.

The four sub-arrays are connected horizontally by row data selectors 14 and are connected vertically by column data selectors 16. Row data selectors 14 pass weights to the right and output data to the left. Column data selectors 16 pass both control information and input data downward.

Configuration controller 20 controls both row data selectors 14 and column data selectors 16. Configuration controller 20 can control column data selectors 16 to select control information and input data from the fourth row of computational cells 10, or directly from control registers 24 and input registers 28, allowing control and input data to bypass the upper 4×4 sub-arrays and thus reduce latency to the lower 4×4 sub-arrays.

Control and data selected the same way, so that inputs of column data selectors 16 are taken from control registers 24, input registers 28, or both inputs are taken from computational cells 10.

Configuration controller 20 also controls row data selectors 14 to select weights from the fourth column of computational cells 10, or directly from weight registers 22. Configuration controller 20 can also send the output generated by edge cells 12 in the right sub-array to the fourth column of computational cells 10 in the left sub-array, or bypass the left sub-array and send the output directly to output registers 26. Column data selectors 16 each can have two 2:1 muxes. Row data selectors 14 each can be two muxes, one forward mux and one de-mux in the reverse direction.

Such bypassing of a 4×4 sub-array reduces latency. Row data selectors 14 and column data selectors 16 can adjust the tile size to reduce latency and increase processing engine utilization of computational cells 10 and edge cells 12. By controlling row data selectors 14 and column data selectors 16, configuration controller 20 can control the data flow from input partitions and layers and configure array connections according to the operation being performed. Such bypassing can broadcast input data into each tile.

Figure 2:
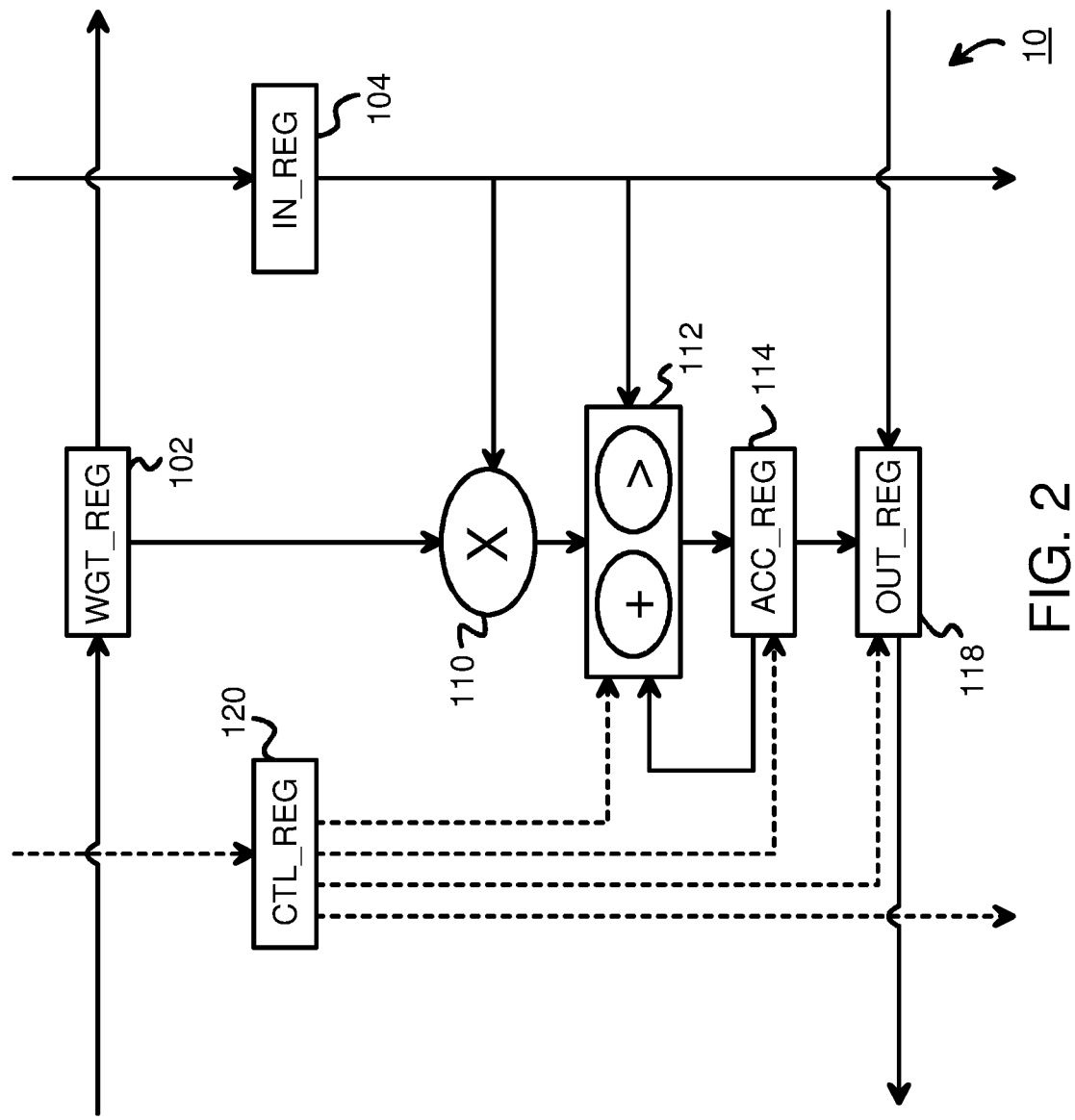
FIG. 2 shows the multi-function computational cell in more detail.

FIG. 2 shows the multi-function computational cell in more detail. Computational cell 10 receives input data from input registers 28, an upstream computational cell 10, or from column data selectors 16, depending on the location of computational cell 10 within the array. This input data is stored in cell input register 104 and can be passed on to a downstream computational cell 10 or to column data selectors 16.

Similarly, computational cell 10 receives control information from control registers 24, an upstream computational cell 10, or from column data selectors 16, depending on the location of computational cell 10 within the array. This control information is stored in cell control register 120 and can be passed on to a downstream computational cell 10 or to column data selectors 16. Bits of control information stored in cell control register 120 are used internally by computational cells 10 to control operation of adder-comparator 112, accumulator register 114, and output register 118.

Computational cell 10 also receives a weight from an upstream (from the left) computational cell 10 or edge cell 12. This weight is stored in cell weight register 102 and can be passed on to a downstream (to the right) computational cell 10 or to row data selectors 14.

The weight from cell weight register 102 may be multiplied by the input from cell input register 104 by multiplier 110 to generate the partial sum for the neural network node implemented by this instance of computational cell 10. The partial sum generated by multiplier 110 can then be added to the accumulated value stored in accumulator register 114 using adder-comparator 112, and the newly accumulated value stored into accumulator register 114.

Adder-comparator 112 can also compare the partial sum generated by multiplier 110, the accumulated value from accumulator register 114, or the input from cell input register 104 to a pre-set target such as zero or to a value from cell input register 104 or accumulator register 114 and store the result into accumulator register 114. Control bits from cell control register 120 can select either the adder or comparator functions of adder-comparator 112, and select inputs from output register 118, multiplier 110, or cell input register 104.

The accumulated value stored in accumulator register 114 can be copied into output register 118, and then shifted into the next computational cell 10 or edge cell 12 to the left of the current computational cell 10. Alternately, the output from the computational cell 10 to the right or from row data selectors 14 can be stored into output register 118 and later shifted to the left. Control bits from cell control register 120 can control clocking and data selection for output register 118.

Figure 3:
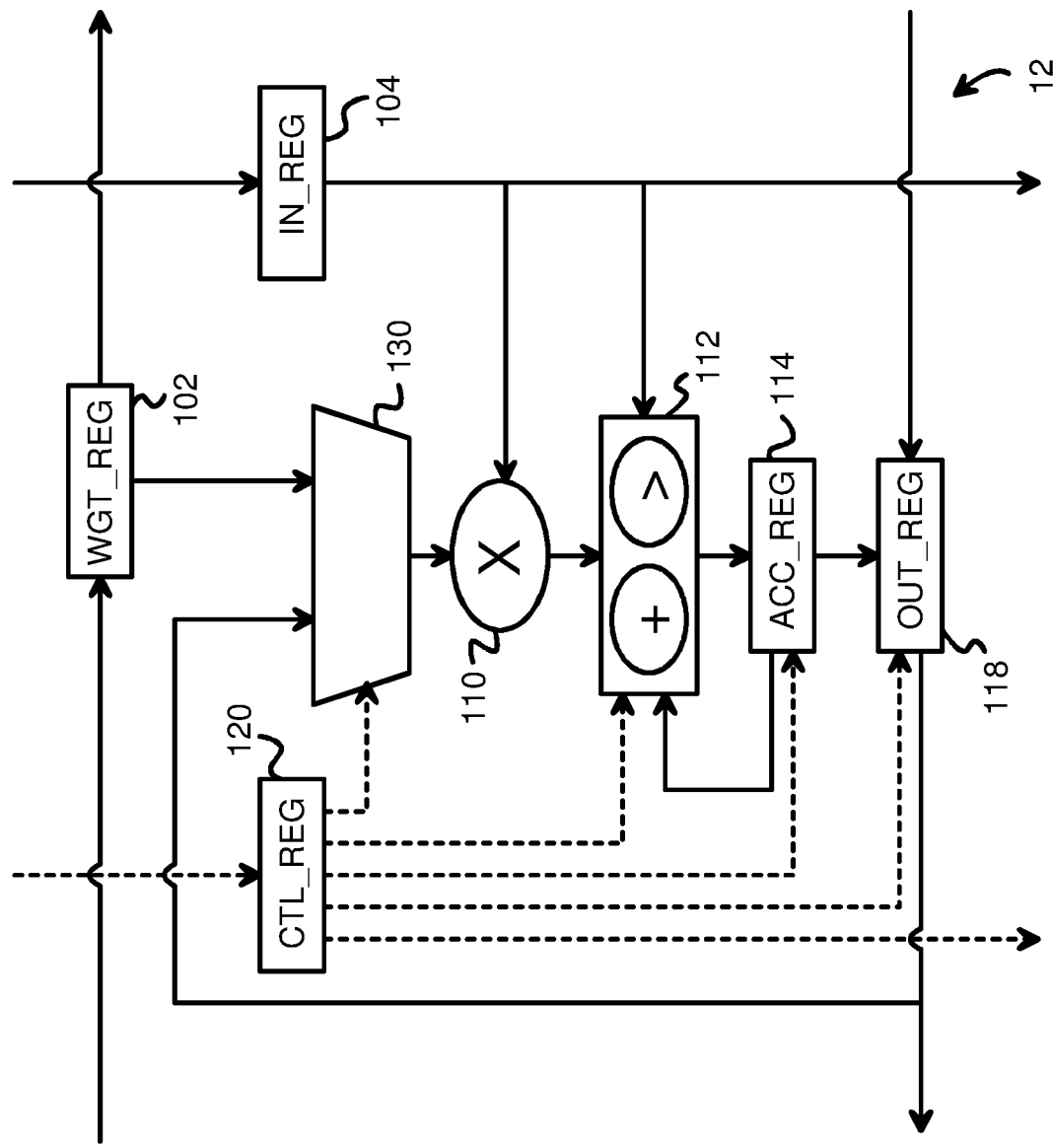
FIG. 3 shows the multi-function computational edge cell in more detail.

FIG. 3 shows the multi-function computational edge cell in more detail. Edge cell 12 is a super-set of computational cell 10, with vector mux 130 added between cell weight register 102 and multiplier 110. Vector mux 130 allows edge cell 12 to function as computational cell 10 when a bit from cell control register 120 causes vector mux 130 to select its input from cell weight register 102 to pass through to multiplier 110.

Vector operations can be performed when control bits from cell control register 120 cause vector mux 130 to select the output value stored in output register 118 to feed back to multiplier 110. The cell's output can be multiplied by the cell's input from cell input register 104 for vector operations. Output register 118 can contain an output value shifted in from the right rather than the accumulated value generated by the cell, permitting a variety of useful operations. Example operations include Prelu(Parametric Rectified Linear Unit), which finds $f(y_i)=y_i$ if $y_i>0$ $f(y_i)=(a_i*y_i)$ if $y_i<=0$, where $y_i$ can be the cell's output while $a_i$ can be the input to cell input register 104.

Edge cells 12 form the left column of each 4×4 sub-array, permitting outputs from upstream cells to the right to be shifted into edge cell 12 and accumulated through the feedback path from output register 118 to vector mux 130. When the input in cell input register 104 is 1, multiplier 110 passes through the feedback output to be accumulated by adder-comparator 112 and stored into accumulator register 114. After all outputs from cells to the right have been accumulated, the final accumulated value from accumulator register 114 can be copied to output register 118 and left-shifted from edge cells 12 to output registers 26.

Without the feedback through vector mux 130, outputs from prior cells cannot be easily pooled. Edge cells 12 provide a convenient mechanism to pool cell results at the edge of a 4×4 sub-array before being output to output registers 26. This pooling mechanism is only needed for edge cells 12 so that other center computational cells 10 do not have the added hardware of vector mux 130. A separate column of pooling engines before output registers 26 is not required since edge cells 12 can perform the cell-pooling function as well as the other functions of computational cells 10.

Edge cell 12 receives a weight from weight registers 22, or from row data selectors 14, depending on the location of computational cell 10 within the array. This control information is stored in cell control register 120 and can be passed on to a downstream computational cell 10.

The compare function may be enabled when performing a max pooling operation. For cells 12, the compare function is enabled when performing max pooling or Relu calculations. Max pooling finds the maximum value. Relu calculates $f(x)=\max(0,x)$, where the output is 0 or x. Both cells 10 and cells 12 can perform max pooling and average pooling calculations; however cells 12 can process pooling calculations right after one convolution layer is finished, taking the CNN output as a pooling input.

Cells 12 performing max pooling (1) have no weights, therefore no weights are taken from weight register 102, (2) get previous CNN output from output register 118, bypass multiplier 110 and store in adder-comparator 112, (3) the second CNN output from output register 118 comes to adder-comparator 112, is compared with the first input, then gets the larger one and is stored in accumulator register 114. (4) The third CNN output is from output register 118, and accumulator register 114 sends the previous larger one to adder-comparator 112, then compares, gets the larger one. And so on . . . .

For a Relu operation: (1) have no weights, therefore no weights from cell weight register 102, (2) vector mux 130 gets the output from output register 118, (3) bypass multiplier 110, therefore adder-comparator 112's input is vector mux 130's output (4) refresh cell input register 104 input=x (5) accumulator register 114 gets the max(0,x) output from adder-comparator 112.

For cells 10 performing a max pooling operation: (1) have no weights, therefore no weights from cell weight register 102, (2) first input from cell input register 104 is stored in adder-comparator 112, (3) the second input from cell input register 104 comes to adder-comparator 112, and is compared with the first input, then the larger one is stored in accumulator register 114. (4) The third input is from cell input register 104 and accumulator register 114 sends previous larger one to adder-comparator 112, which compares them, and gets the larger one. And so on.

Since output registers are on the left side of the array, and cells 12 can act as Relu/Prelu engines, every output must go through cells 12 to get the Relu/Prelu result. Thus edge cells 12 are located on the left, and not on the right of each 4×4 sub-array.

Figure 4:
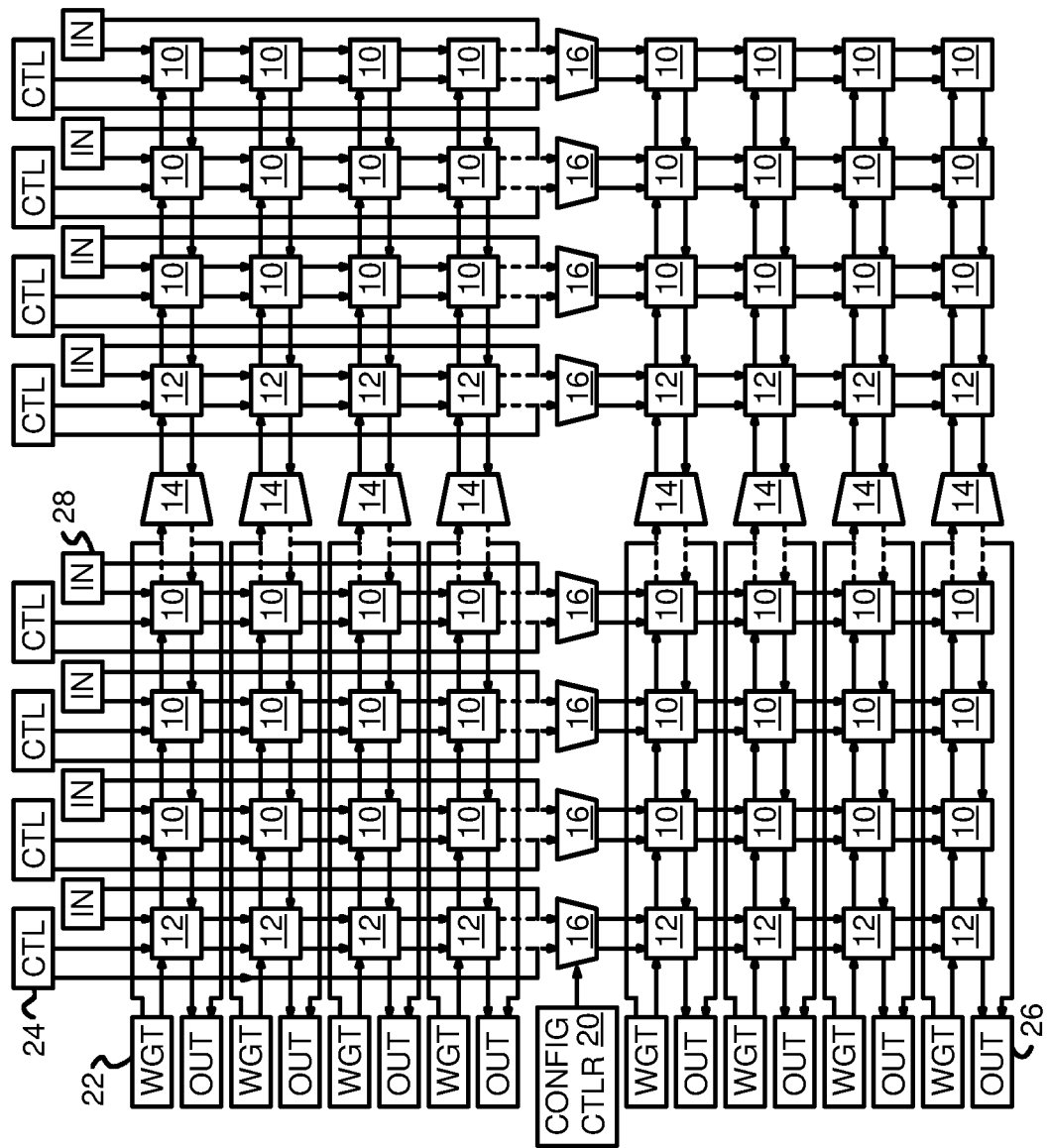
FIG. 4 shows a dynamic-tile neural network accelerator configured for a 4×4 tile size.

FIG. 4 shows a dynamic-tile neural network accelerator configured for a 4×4 tile size. Each 4×4 sub-array is one tile, so there are 4 tiles available in this configuration. Configuration controller 20 causes column data selectors 16 to select inputs from control registers 24 and input registers 28, bypassing control and input data around the upper tiles of computational cells 10, 12. The upper and lower 4×4 tiles are configured in parallel to each receive data directly from input registers 28 and control bits directly from control registers 24. The upper and lower tiles are separated from each other by column data selectors 16.

Configuration controller 20 also causes row data selectors 14 to select the bypass paths. Weights from weight registers 22 are applied to edge cells 12 in both left and right 4×4 tiles at the same time, since row data selectors 14 select weights from weight registers 22 rather than from the last column of computational cells 10 in the left 4×4 tiles. Output data generated by edge cells 12 in the right 4×4 tiles are passed through row data selectors 14 directly to output registers 26, bypassing computational cells 10 in the left 4×4 tiles.

Each of the four tiles of 4×4 computational cells 10, 12 can be separately loaded with input data, weights, and control, and can generate outputs independently of other tiles. Four independent process streams can operate simultaneously with the four tiles.

Figure 5:
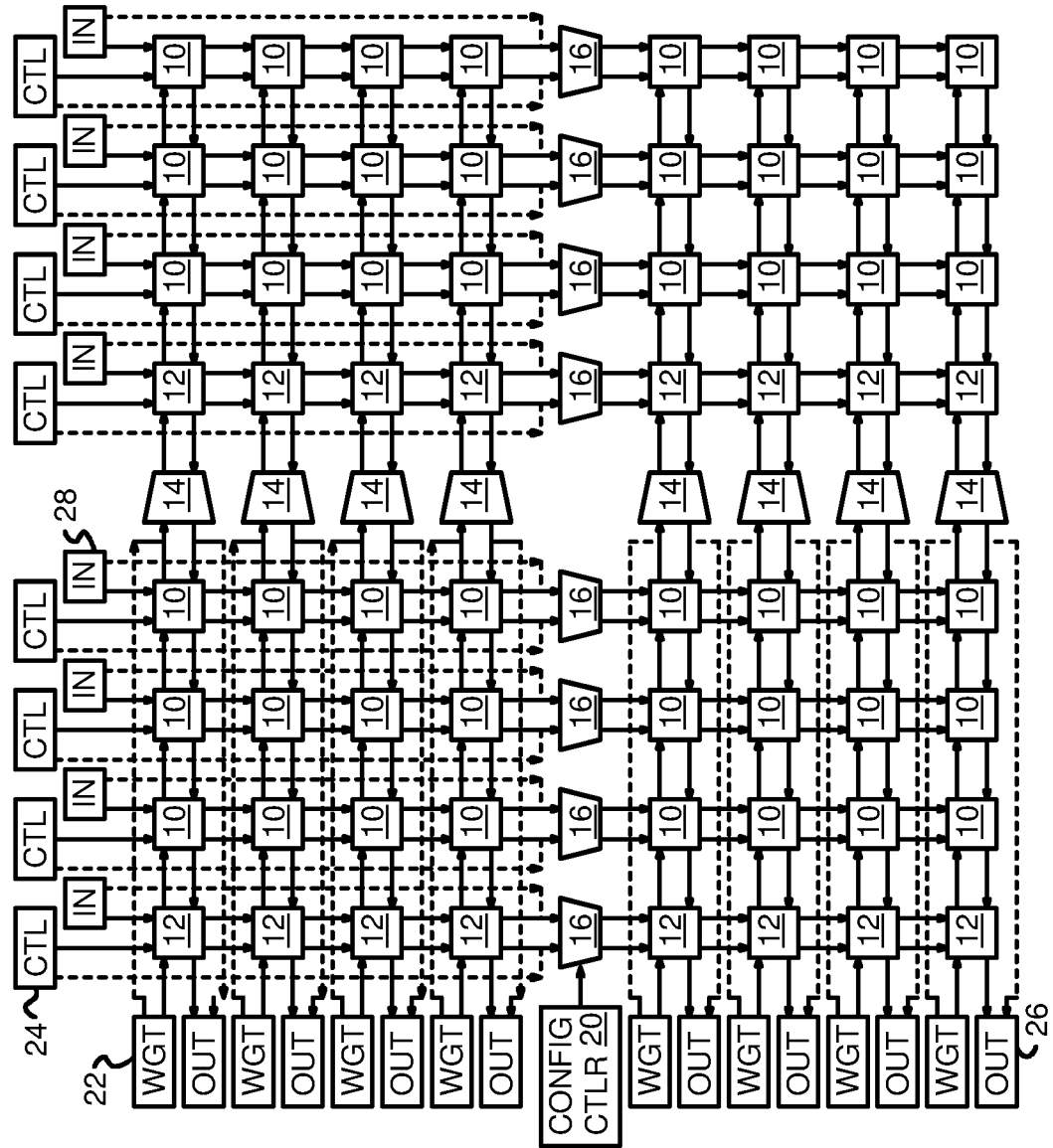
FIG. 5 shows a dynamic-tile neural network accelerator configured for an 8×8 tile size.

FIG. 5 shows a dynamic-tile neural network accelerator configured for an 8×8 tile size. The four 4×4 sub-arrays are combined to form one tile, so there is only 1 4 tile available in this configuration.

Configuration controller 20 causes column data selectors 16 to select control and inputs from the row of edge cells 12 and computational cells 10 immediately above (upstream) of column data selectors 16. Control registers 24 and input registers 28 only provide control and data to the top row of edge cells 12, computational cells 10. This control and input data can be shifted downward to reach downstream cells. Eight shift cycles would be needed to reach all computational cells 10 in the 8 rows.

Configuration controller 20 also causes row data selectors 14 to select the adjacent cell paths. Weights from the fourth column of computational cells 10 are selected by row data selectors 14 and applied to edge cells 12 in the fifth column of the 8×8 tile. Outputs generated by edge cells 12 in the fifth column are selected by row data selectors 14 and applied to the fourth row of computational cells 10, to the left of row data selectors 14.

Weights from weight registers 22 are applied to edge cells 12 in only the left 4×4 sub-array. Output registers 26 only collect output data generated by or left-shifted through the left-most column of edge cells 12. Control bits from control registers 24 and input data from input registers 28 are applied only to the top row of edge cells 12, computational cells 10, and must be shifted down to other rows of cells. After eight shift-cycles the control and input data reaches the bottom row of computational cells 10, edge cells 12.

All four 4×4 sub-arrays are coupled together by row data selectors 14 and column data selectors 16 selecting the adjacent paths rather than the bypass paths. The entire array acts as a single 8×8 tile. This tile has four times the processing resources of each 4×4 tile in FIG. 4, allowing for more complex computations to be performed with likely a greater efficiency. However, only one independent process stream can operate simultaneously with the single 8×8 tile.

Figure 6:
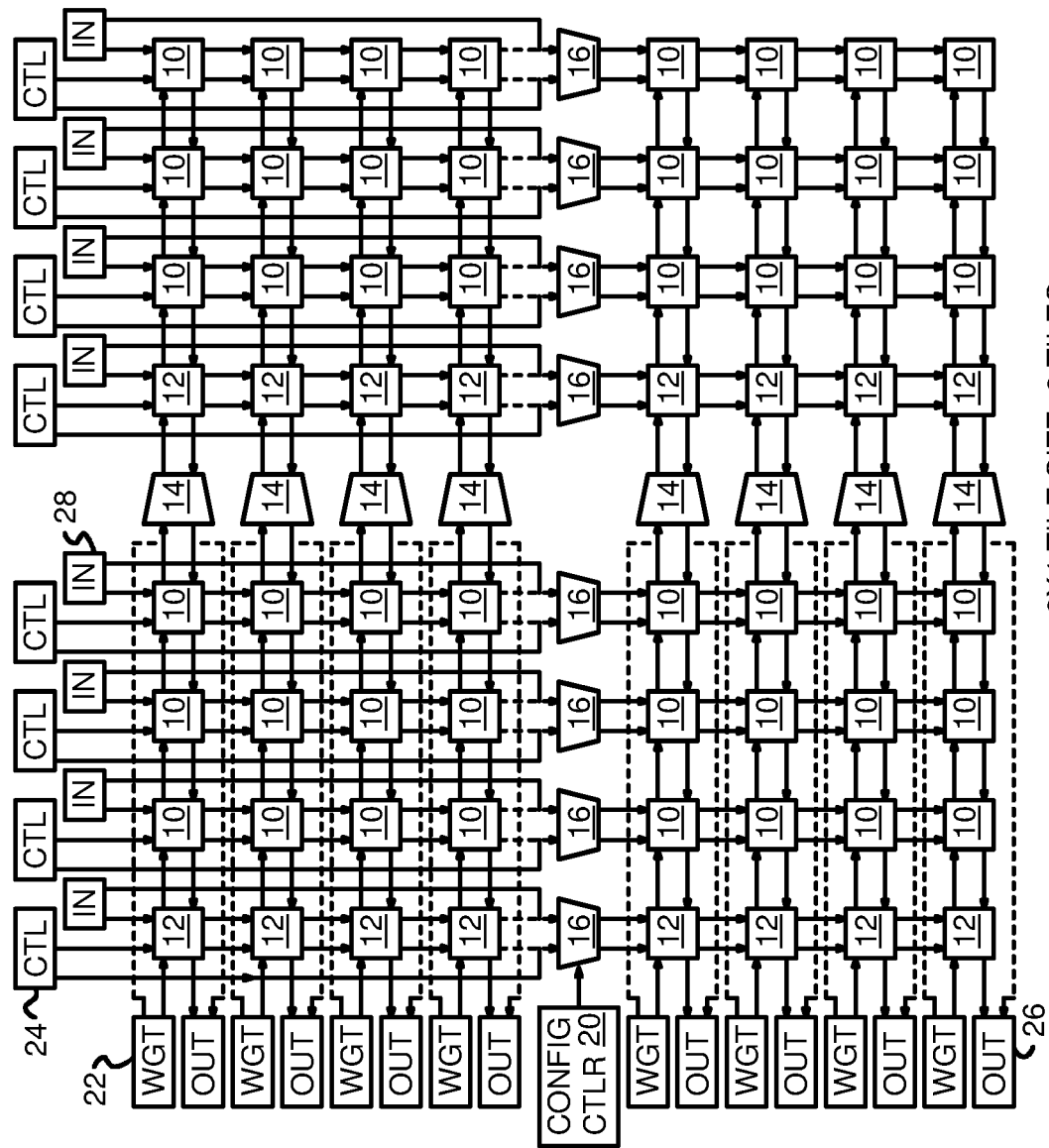
FIG. 6 shows a dynamic-tile neural network accelerator configured for a 8×4 tile size.

FIG. 6 shows a dynamic-tile neural network accelerator configured for a 8×4 tile size. Two 4×4 sub-arrays on the top are combined horizontally to form one tile, and the two 4×4 sub-arrays on the bottom are combined horizontally to form a second tile, so there are 2 tiles available in this configuration.

Configuration controller 20 causes column data selectors 16 to select inputs from control registers 24 and input registers 28, bypassing control and input data around the upper 8×4 tile of computational cells 10, 12. The upper and lower 8×4 tiles are configured in parallel to each receive data directly from input registers 28 and control bits directly from control registers 24. The upper and lower tiles are separated from each other by column data selectors 16.

Configuration controller 20 also causes row data selectors 14 to select the adjacent cell paths. Weights from the fourth column of computational cells 10 are selected by row data selectors 14 and applied to edge cells 12 in the fifth column of the 8×4 tile. Outputs generated by edge cells 12 in the fifth column are selected by row data selectors 14 and applied to the fourth row of computational cells 10, to the left of row data selectors 14.

Weights from weight registers 22 are applied to edge cells 12 in only the left 4×4 sub-array. Output registers 26 only collect output data generated by or left-shifted through the left-most column of edge cells 12.

Each of the two tiles of 8×4 computational cells 10, 12 can be separately loaded with input data, weights, and control, and can generate outputs independently of the other tile. Two independent process streams can operate simultaneously with the two tiles. Each tile has double the processing power of the 4×4 tile of Fig.

Figure 7:
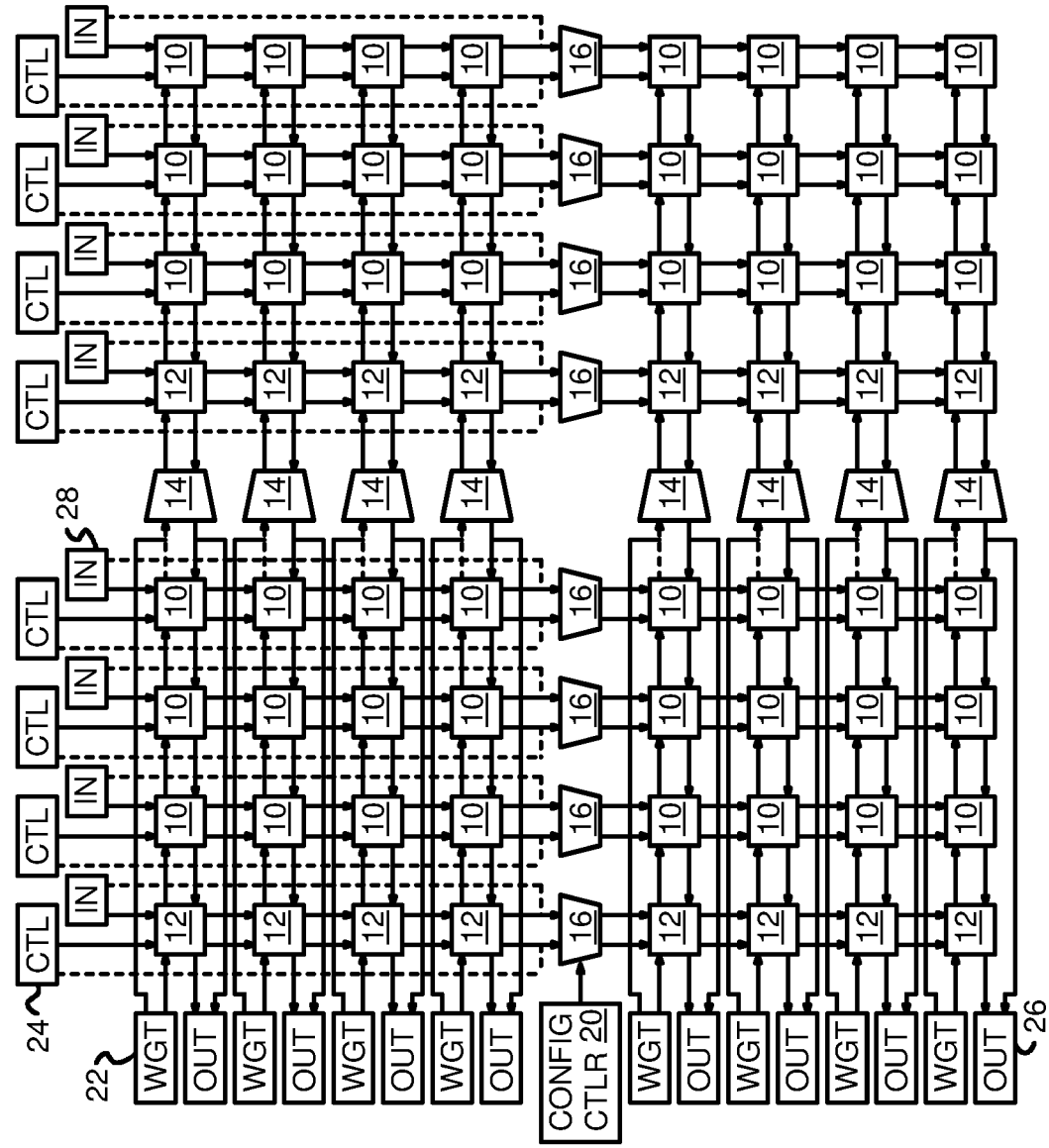
FIG. 7 shows a dynamic-tile neural network accelerator configured for a 4×8 tile size.

FIG. 7 shows a dynamic-tile neural network accelerator configured for a 4×8 tile size. Two 4×4 sub-arrays on the left are combined vertically to form one tile, and the two 4×4 sub-arrays on the right are combined vertically to form a second tile, so there are 2 tiles available in this configuration.

Configuration controller 20 causes column data selectors 16 to select control and inputs from the row of edge cells 12 and computational cells 10 immediately above (upstream) of column data selectors 16. Control registers 24 and input registers 28 only provide control and data to the top row of edge cells 12, computational cells 10. This control and input data can be shifted downward to reach downstream cells. Eight shift cycles would be needed to reach all computational cells 10 in the 8 rows.

Configuration controller 20 also causes row data selectors 14 to select the bypass paths. Weights from weight registers 22 are applied to edge cells 12 in both left and right 4×8 tiles at the same time, since row data selectors 14 select weights from weight registers 22 rather than from the last column of computational cells 10 in the left 4×8 tile. Output data generated by edge cells 12 in the right 4×8 tile is passed through row data selectors 14 directly to output registers 26, bypassing computational cells 10 in the left 4×8 tile.

Control bits from control registers 24 and input data from input registers 28 are applied only to the top row of edge cells 12 and computational cells 10, so control and input data must be shifted down to other rows of cells. After eight shift-cycles the control and input data reaches the bottom row of computational cells 10 and edge cells 12.

Each of the two tiles of 4×8 computational cells 10, 12 can be separately loaded with input data, weights, and control, and can generate outputs independently of the other tile. Two independent process streams can operate simultaneously with the two tiles. Each tile has double the processing power of the 4×4 tile of FIG. 4.

Figure 8A:
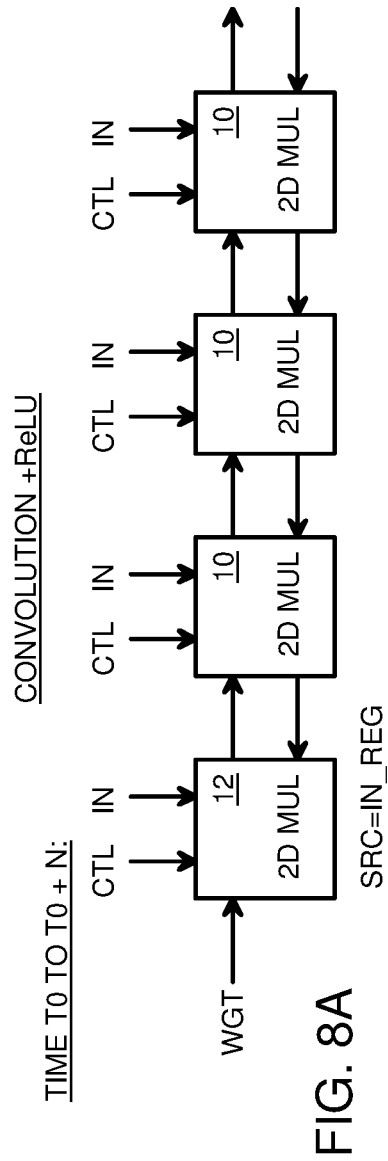
FIGS. 8A-8B highlight dynamic scheduling of cells for convolution and Rectified Linear Unit (ReLU) operations.
Figure 8B:
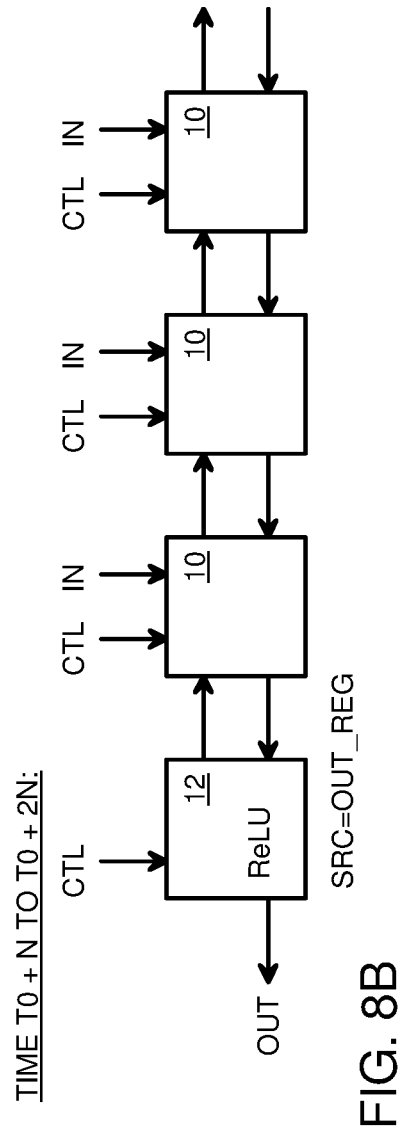

FIGS. 8A-8B highlight dynamic scheduling of cells for convolution and Rectified Linear Unit (ReLU) operations. Multiple operations, such as convolution and ReLU, can be integrated and executed on the dynamic-tile neural network accelerator. Operations can be pipelined and performed in parallel in the array of computational cells, reducing the overall processing time. An example of performing an integrated convolution and ReLU operation using the dynamic-tile neural network accelerator is described in FIGS. 8A-8B. Four adjacent cells in a row are shown, with edge cell 12 on the left followed by three computational cells 10.

In FIG. 8A, a convolution operation is performed. The control bits, input data, and weight values can change for each cycle.

Inputs IN and control CTL are applied to each column, and a series of weights WGT are successively shifted from weight register 22 into edge cell 12, and right-shifted into computational cells 10 over the next 3 cycles until time T0+N. During this time edge cell 12 operates as a 2D multiplier cell, as do computational cells 10. Each cell 10, 12 multiplies its input IN with the weight shifted in from the left to form a partial sum. Each cell accumulates the weighted inputs over time.

In FIG. 8B, a ReLU operation is performed on shifted results of the convolution. The accumulated results from computational cells 10 are left shifted from output register 118 of a computational cell 10 on the right to output register 118 to the next computational cell 10 on the left for each cycle from time T0+N to T0+2N.

Finally the accumulated results are left-shifted into edge cell 12, which performs a ReLU operation. The accumulated results from computational cells 10 that were left-shifted into output register 118 of edge cell 12 are fed back through vector mux 130 to multiplier 110 and adder-comparator 112 in edge cell 12 to be further operated upon. For example, maximum pooling can be performed by edge cell 12 by comparing each accumulated result fed back through vector mux 130 to adder-comparator 112, and accumulating only results that exceed the maximum value applied to input IN of edge cell 12.

In FIG. 8A, edge cell 12-1 operates as a 2D multiplier, functioning the same as computational cells 10. Vector mux 130 passes the weight from cell input register 104 to multiplier 110 (SRC=IN_REG).

In FIG. 8B, edge cell 12-1 operates as a ReLU engine with additional functionality beyond that of computational cells 10. Vector mux 130 feeds back the left-shifted accumulated results stored in output register 118 back to multiplier 110 and adder-comparator 112. (SRC=OUT_REG). Edge cell 12-1 can then shift the ReLU pooled result from its output register 118 out to output register 26.

FIGS. 9A-9B highlight the timing of the convolution and ReLU operations of FIGS. 8A-8B in more detail. Left-most edge cell 12-1, and computational cells 10-2, 10-3, and 10-4 are in the same row, as shown in FIG. 8A.

In FIG. 9A, at time T0, control bits stored in cell control register 120 of edge cell 12-1 cause edge cell 12-1 to perform a clear operation, clearing output register 118, accumulator register 114, multiplier 110, and adder-comparator 112. Input A01 from input registers 28 is stored into cell input register 104, while weight W01 from weight registers 22 is stored into cell weight register 102.

At time T0+1, control bits stored in cell control register 120 of computational cell 10-2 cause computational cell 10-2 to perform a clear operation, clearing output register 118, accumulator register 114, multiplier 110, and adder-comparator 112. Input A11 from input registers 28 is stored into cell input register 104, while weight W01 that is right-shifted from edge cell 12-1 is stored into cell weight register 102 of cell 10-2.

Also at time T0+1, control bits (CMP_EN=1'B0) that disable the comparator are stored in cell control register 120 of edge cell 12-1 and cause edge cell 12-1 to perform a multiply and accumulate operation. The values stored in the prior cycle into cell weight register 102, W01, and cell input register 104, A01, are multiplied together by multiplier 110 and accumulated and stored into accumulator register 114 as A01×W01. Input A02 from input registers 28 is stored into cell input register 104, while weight W02 from weight registers 22 is stored into cell weight register 102.

At time T0+2, control bits stored in cell control register 120 of next computational cell 10-3 cause computational cell 10-3 to perform a clear operation, clearing its output register 118, accumulator register 114, multiplier 110, and adder-comparator 112. Input A21 from input registers 28 is stored into cell input register 104, while weight W01 that is right-shifted from cell 10-2 is stored into cell weight register 102.

Also at time T0+2, control bits (CMP_EN=1'B0) stored in cell control register 120 of computational cell 10-2 cause cell 10-2 to perform a multiply and accumulate operation. The values stored in the prior cycle into cell weight register 102, W01, and cell input register 104, A11, are multiplied together by multiplier 110 and accumulated and stored into accumulator register 114 as A11×W01. Input A12 from input registers 28 is stored into cell input register 104, while weight W02 from weight registers 22 is stored into cell weight register 102.

Further at time T0+2, control bits previously applied to and stored in edge cell 12-1 cause edge cell 12-1 to again perform a multiply and accumulate operation. The values stored in the prior cycle into cell weight register 102, W02, and cell input register 104, A02, are multiplied together by multiplier 110 and accumulated and stored into accumulator register 114 as A02×W02+A01×W01. Input A03 from input registers 28 is stored into cell input register 104, while weight W03 from weight registers 22 is stored into cell weight register 102.

At time T0+3, control bits stored in cell control register 120 of next computational cell 10-4 cause computational cell 10-4 to perform a clear operation, clearing its output register 118, accumulator register 114, multiplier 110, and adder-comparator 112. Input A31 from input registers 28 is stored into cell input register 104, while weight W01 that is right-shifted from cell 10-3 is stored into cell weight register 102.

Also at time T0+3, control bits (CMP_EN=1'B0) stored in cell control register 120 of computational cell 10-3 cause cell 10-3 to perform a multiply and accumulate operation. The values stored in the prior cycle into cell weight register 102, W01, and cell input register 104, A21, are multiplied together by multiplier 110 and accumulated and stored into accumulator register 114 as A21×W01.

Since time T0+3 is the last cycle (N=4 for four cells in a row), the same input and weight values are applied to cells 12-1, 10-2, 10-3, 10-4, as these values are never used.

Further at time T0+3, control bits previously applied to and stored in edge cell 12-1 cause edge cell 12-1 to again perform a multiply and accumulate operation. The values stored in the prior cycle into cell weight register 102, W03, and cell input register 104, A03, are multiplied together by multiplier 110 and accumulated and stored into accumulator register 114 as A03×W03+A02×W02+A01×W01.

When the number of cells in the tile's row, N, is more than 4, this process can continue until N is reached at time T0+N−1. The accumulated value from accumulator register 114 is copied to output register 118 as output O01, O02, O03, and O04 for cells 12-1, 10-2, 10-3, and 10-4, respectively, before time T0+N.

In FIG. 9B, at time T0+N, control bits (CMP_EN=1'B1) that enable the comparator are stored in cell control register 120 in edge cell 12-1 and cause edge cell 12-1 to perform a ReLU operation. Vector mux 130 selects the feedback from output register 118, O01, and applies O01 through multiplier 110 to adder-comparator 112, which compares O01 to zero. When O01 is greater than zero, no change is made to O01 stored in output register 118. However, when O01 is less than zero, cell 12-1 clears output register 118. Thus the ReLU operation rectifies the value stored in output register 118 to remove any negative values.

At time T0+N+1, the control bits stored in cell control register 120 in edge cell 12-1 cause edge cell 12-1 to left-shift the rectified O01 stored in output register 118 in cell 12-1 to output registers 26. The control bits stored into cell control register 120 of computational cells 10-2, 10-3, 10-4 cause cells 10-2, 10-3, 10-4 to left-shift their values O02, O03, O04 stored in their output register 118. Thus all output values are left shifted so that output register 118 of cells 12-1, 10-2, 10-3, 10-4 store O02, O03, O04, XX at the end of the left-shift cycle at time T0+N+1.

At time T0+N+2, control bits (CMP_EN=1'B1) stored in cell control register 120 in edge cell 12-1 cause edge cell 12-1 to perform another ReLU operation. Vector mux 130 selects the feedback from output register 118, O02, and applies O02 through multiplier 110 to adder-comparator 112, which compares O02 to zero. When O02 is greater than zero, no change is made to O02 stored in output register 118. However, when O02 is less than zero, cell 12-1 clears output register 118. The ReLU operation rectifies the value stored in output register 118 to remove any negative values.

At time T0+N+3, the control bits stored in cell control register 120 in edge cell 12-1 cause edge cell 12-1 to left-shift the rectified O02 stored in output register 118 in cell 12-1 to output registers 26. The control bits stored into cell control register 120 of computational cells 10-2, 10-3, 10-4 cause cells 10-2, 10-3, 10-4 to left-shift their values O03, O04, XX stored in their output register 118. Thus all output values are left shifted so that output register 118 of cells 12-1, 10-2, 10-3, 10-4 store O03, O04, XX, XX at the end of the left-shift cycle at time T0+N+3.

Another ReLU operation is performed by cell 12-1 on output value O03 during time T0+N+4, which is left-shifted out of the array to output registers 26 during time T0+N+5, when O04 is left-shifted into output register 118 of cell 12-1. Then at time T0+N+6, cell 12-1 generates ReLU(O04) that is stored in output register 118 and shifted out to output registers 26 at time T0+N+7. ReLU operations cab ne performed by cell 12-1 every other cycle after intervening left-shifts until all N accumulated values O01, O02, O03, O04, . . . O0N have been processed.

FIG. 10 shows the timing of the convolution and ReLU with pooling. In this variation, pooling is added to the ReLU operation.

The process proceeds as described before for FIGS. 8A-8B and 9A so that accumulated values from the convolution are stored in output register 118 of cells 12-1, 10-2, 10-3, 10-4. FIG. 10 replaces FIG. 9B when pooling is integrated with the ReLU operation.

In FIG. 10, at time T0+N, control bits (CMP_EN=1'B0) that disable the comparator are stored in cell control register 120 in edge cell 12-1 and cause edge cell 12-1 to perform a ReLU operation with max pooling.

The prior maximum of all previous ReLU operations is stored in accumulator register 114. Initially, accumulator register 114 is cleared to zero before the first ReLU operation. Thus, for the first ReLU operation, O01 is compared to zero. All subsequent values of accumulator register 114 will be greater than or equal to zero, so rectification is accomplished for all subsequent cycles of ReLU operations.

Figure 11:
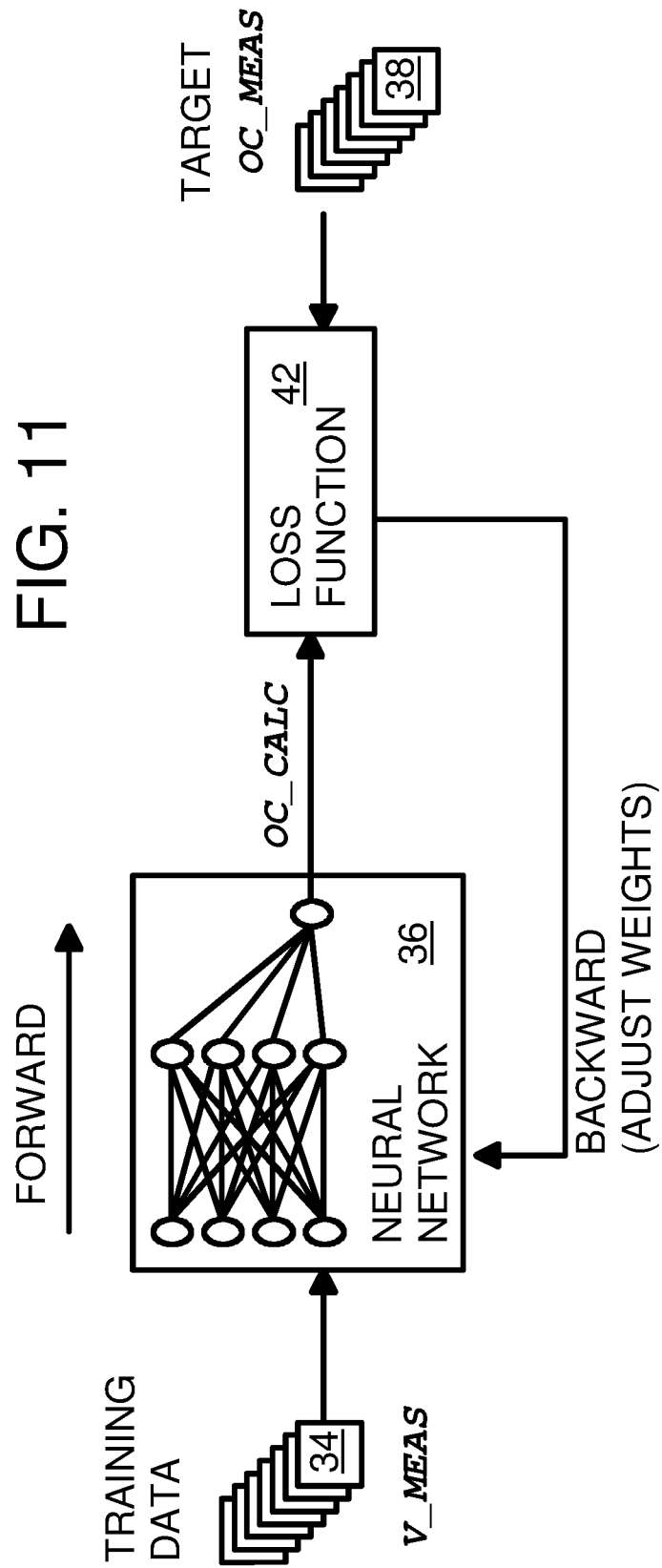
FIG. 11 shows training a neural network such as the neural network accelerator of FIG. 1.

The cycles operations and left-shifts described earlier for FIG. 9B apply to FIG. 11, except that the ReLU operations by cell 12-1 at times T0+N on O01, T0+N+2 on O02, etc., are modified.

For example at time T0+N+2, the output recently left-shifted into output register 118, O02, is fed back through vector mux 130 and through multiplier 110 to adder-comparator 112, which compares O02 to the prior maximum stored in accumulator register 114. When O02 is greater than the prior maximum stored in accumulator register 114, then O02 overwrites the prior maximum stored in accumulator register 114, and no change is made to O02 stored in output register 118. However, when O02 is less than the prior maximum stored in accumulator register 114, cell 12-1 copies the prior maximum from accumulator register 114 to overwrite output register 118. Thus the ReLU operation with max pooling rectifies the value stored in output register 118 to remove any negative values.

Average pooling can also be integrated with ReLU. For average pooling, all inputs are accumulated, then a shifter is used to calculate the average value. Cells 10, 12 (FIGS. 2, 3) have no shifter, but a shifter can be added to support average pooling if desired.

FIG. 11 shows training a neural network such as the neural network accelerator of FIG. 1. Measurement data such as voltage measurements are used as training data 34, V_MEAS. The measured result data that corresponds to the V_MEAS values are recorded as target data 38, OC_MEAS. Each value of OC_MEAS corresponds to a value of V_MEAS that were measured together. Many examples of input data and output results could be substituted.

Neural network 36 receives training data 34 and a current set of weights $A_{ij}$, $B_{ij}$, $W_{ij}$, and operates on training data 34 to generate a result. This generated result is the modeled value of OC, OC_CALC. The generated result from neural network 36, OC_CALC, is compared to target data 38, OC_MEAS, by loss function 42, which generates a loss value that is a function of how far the generated result is from the target. The loss value generated by loss function 42 is used to adjust the weights applied to neural network 36. Many iterations of weights may be applied by loss function 42 onto training data 34 until a minimum loss value is identified, and the final set of weights used to model the calibration curve.

Rather than generate a single value of OC_CALC, neural network 36 may have multiple output nodes 60 to generate many OC_CALC values in parallel from the parallel inputs of V_MEAS. Loss function 42 may compare in parallel the many values of OC_CALC to many values of OC_MEAS to generate a loss function value.

ALTERNATE EMBODIMENTS

Several other embodiments are contemplated by the inventors. For example while 4×4 sub arrays have been shown in the simplified examples, actual neural networks may be much larger. There may be more than 4 sub-arrays that can be combined together to form larger tiles. Tiles could have other shapes besides rectangular. The number of cells in a row within the tile, N, has been described as 4 in some examples, but N can be much larger, such as 1K.

There could be more than one column of data selectors 14, such as 3 columns of row data selectors 14 separating 4 sub-arrays in the horizontal direction. Likewise, there could be more than one row of column data selectors 16. A dynamic-tile neural network accelerator could have 16 sub-arrays of N×N each, separated by 3 columns of row data selectors 14 and 3 rows of column data selectors 16. N could be a larger value such as 64, so that there are 16 sub-arrays of 64×64 cells each, and dynamic tiles could range in size from 64×64 up to 1K×1K. Many other arrangements are possible.

A complex operation that includes convolution integrated with ReLU has been described, but other operation types could be substituted or merged. Many modifications to the operations are possible, such as global ReLU, PreLU, etc. Convolutions are widely used in neural networks, especially for image processing, where a filter many be applied many times over the image data to generate activations that form a feature map. These features can be selected for further or more specialized processing. ReLU operations are also widely used and useful to eliminate negative value or negative slope effects that can confuse the data analysis.

The flexibility of dynamic tile sizes can allow for boosted efficiency when many smaller tiles are used for convolutions to generate feature maps with a large number of output channels. Hardware efficiency can be improved, and processing time reduced.

The overall processing time of these integrated operations can be reduced by having one parallel engine that can perform these multiple operations. Chip area, cost, and power consumption can be reduced. Specialized hardware does not need to be added, such as for a summing layer. The simple addition of vector mux 130 and the feedback path from output register 118 allows for ReLU and pooling operations using a basic computational cell with only a relatively minor increase in cell hardware. Only the cells at the edge need the additional hardware of vector mux 130, center cells do not have t have vector mux 130 added.

The functions of computational cells 10 and edge cells 12 shown in FIGS. 2, 3 may be implemented or modified in various ways. Multiplier 110 does not have to be separate from adder-comparator 112 but may be integrated together into a single Arithmetic-Logic Unit (ALU) or other Processing Engine (PE). Additional control, compare and test circuitry may be present and not shown in FIGS. 2, 3. The control bits may be an opcode and may be decoded by the cell into various control signals. The sequencing of data flows and operations within computational cells 10, edge cells 12 may be implemented in a variety of ways and timings.

Data and control may be pipelined. For example, control bits may be sent from control registers 24 to cell control register 120 the cycle before the operation indicated by those control bits are performed by cell components such as multiplier 110 and adder-comparator 112. Additional pipeline buffers and latches may be added.

Cell weight register 102, cell input register 104, cell control register 120, accumulator register 114, and output register 118 could be part of a register file or a memory rather than discrete registers. Alternately, these register could be implemented by random logic or computer-generated logic gates or macro layout cells.

Some embodiments may not use all components. Additional components may be added. Loss function 42 may use various error/loss and cost generators, such as a weight decay term that prevents weights from growing too large over many cycles of training optimization, a sparsity penalty that encourages nodes to zero their weights, so that only a small fraction of total nodes are used. Many substitutions, combinations, and variations are possible. Other variations and kinds of loss or cost terms can be added to loss function 42. The values of the relative scaling factors for the different cost functions can be adjusted to balance the impact of the various functions. The training endpoint for the neural network may be set for various combinations of conditions, such as a desired final accuracy, an accuracy-hardware cost product, a target hardware cost, etc.

Neural network 36, loss function 42, and other components may be implemented in a variety of technologies, using various combinations of software, hardware, firmware, routines, modules, functions, etc. The final result may be derived from neural network 36 with the final weights, and might be implemented as a program module, or in an Application-Specific Integrated Circuit (ASIC) or other hardware to increase processing speed and lower power consumption.

Terms such as left, right, up, down, are relative and can be flipped, rotated, transformed, or transposed in various ways. A mirror image of the array can be used, where left-shifting is replaced by right-shifting. While control registers 24 and input registers 28 have been shown on the top side of the array, they could be on the bottom of the array, or control registers 24 could be on the top of the array and input registers 28 on the bottom of the array. Weight registers 22 and output registers 26 could be located on the right of the array rather than on the left. These registers could also be located between arrays. More than one array may be present.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dynamic-tile neural network accelerator comprising:
   an array of computational cells, each computational cell having a multiplier and an adder-comparator, that operate upon an input, a weight, and an output in response to control bits to generate a result to overwrite the output;
   wherein inputs, weights, outputs, and control bits are shifted between adjacent computational cells within the array;
   a configuration controller that re-configures the array of computational cells into a plurality of tiles of a first tile size when configured for a first mode, and into at least one tile of a second tile size when configured for a second mode;
   wherein the second tile size is larger than the first tile size;
   a column of row data selectors inserted between two adjacent columns of the array of computational cells, wherein a row data selector in the column of row data selectors bypasses weights and outputs around a sub-array of computational cells within the array of computational cells when the configuration controller is in the first mode, and wherein the row data selector directly passes weights and outputs through between adjacent computational cells in the two adjacent columns of the array of computational cells when the configuration controller is in the second mode;
   a row of column data selectors inserted between two adjacent rows of the array of computational cells, wherein a column data selector in the row of column data selectors bypasses control bits and inputs around a sub-array of computational cells within the array of computational cells when the configuration controller is in the first mode, and wherein the column data selector directly passes control bits and inputs through between adjacent computational cells in the two adjacent rows of the array of computational cells when the configuration controller is in the second mode; and
   an initial column of weight registers and output registers, wherein the weight registers shift weights into edge cells in a first column of the array of computational cells, and wherein the output registers receive outputs shifted from the edge cells in the first column;
   wherein weights from the weight registers are shifted from the initial column into the edge cells in the first column, and then shifted from the edge cells in the first column to computational cells in a second column adjacent to the first column, and then shifted to other columns of the computational cells;
   wherein outputs generated by the computational cells are shifted toward the initial column to adjacent computational cells, and shifted through the second column of computational cells and into the edge cells in the first column,
   whereby the configuration controller configures the column of row data selectors and the row of column data selectors to bypass to configure the array for the first tile size, and to not bypass to configure the array for the second tile size.

2. The dynamic-tile neural network accelerator of claim 1 further comprising:
   a vector mux in each of the edge cells, the vector mux feeding back the output shifted into an edge cell from the second column to a feedback input of an adder-comparator in the edge cell, the edge cell configured to compare the feedback input to conditionally modify the output before shifting to the output registers in the initial column;
   wherein the edge cells are modified computational cells having the vector mux that is not present in the computational cells, wherein edge cells use the vector mux to feedback the output shifted in from an adjacent computational cell to the adder-comparator, while the computational cells are not able to feedback the output shifted in from an adjacent computational cell to the adder-comparator.

3. The dynamic-tile neural network accelerator of claim 2 further comprising:
   wherein the column of row data selectors select weights directly from the weight registers in the initial column to bypass computational cells between the column of row data selectors and the initial column when the configuration controller is in the first mode.

4. The dynamic-tile neural network accelerator of claim 3 further comprising:
   an alternate column of edge cells that are adjacent to the column of row data selectors and not between the initial column and the column of row data selectors;
   wherein edge cells in the alternate column of edge cells operate as computational cells when the configuration controller is in the second mode;
   wherein edge cells in the alternate column of edge cells use the vector mux to feedback outputs shifted in and originally generated by other computational cells when the configuration controller is in the first mode.

5. The dynamic-tile neural network accelerator of claim 4 wherein the column of row data selectors send outputs directly to the output registers in the initial column to bypass computational cells between the column of row data selectors and the initial column when the configuration controller is in the first mode.

6. The dynamic-tile neural network accelerator of claim 5 wherein each computational cell and each edge cell comprises a cell that comprises:
   a cell weight register configured to store a weight shifted into the cell;
   a cell input register configured to store an input shifted into the cell;

an accumulator register configured to store an accumulated value;

an output register that is able to receive an output shifted in from an adjacent computational cells and is able to receive the accumulated value stored in the accumulator register;

a multiplier configured to multiply the weight from the cell weight register with the input from the cell input register to generate a result;

an adder-comparator that is able to add the result from the multiplier to the accumulated value stored in the accumulator register to generate an updated accumulated value to update the accumulator register, and is able to perform a compare operation to update the accumulated value.

7. The dynamic-tile neural network accelerator of claim 6 wherein each edge cell further comprises:

the vector mux that feeds back the output stored in the output register to the adder-comparator, wherein each edge cell is able to perform a compare operation upon outputs shifted into the output register from adjacent computational cells, wherein the computational cells are not able to perform the compare operation upon outputs shifted into the output register from adjacent computational cells.

8. The dynamic-tile neural network accelerator of claim 7 wherein the vector mux feeds back to the adder-comparator through the multiplier.

9. The dynamic-tile neural network accelerator of claim 5 wherein the weights are shifted horizontally among adjacent computational cells in a row in a first direction away from the initial column;

wherein the outputs are shifted horizontally among adjacent computational cells in the row in a second direction toward the initial column;

wherein the second direction is opposite of the first direction, whereby weights and outputs are shifted in opposite directions.

10. The dynamic-tile neural network accelerator of claim 9 further comprising:

control registers in an initial row configured to store control bits that are shifted into a first row of the computational cells;

input registers in the initial row that store inputs that are shifted into a first row of the computational cells;

wherein the control bits and the inputs are shifted between adjacent computational cells in a vertical direction.

11. The dynamic-tile neural network accelerator of claim 10 wherein the second tile size is at least four times larger than the first tile size.

12. A neural network accelerator comprising:

an array of computational cells partitioned into sub-arrays, each sub-array having a first column of edge cells and other columns of computational cells;

wherein the edge cells are computational cells with additional hardware to perform pooling operations;

a plurality of weight registers configured to store weights that are shifted into the array through the edge cells;

a plurality of output registers configured to store outputs shifted out of the edge cells;

a plurality of control registers configured to shift control bits into the array;

a plurality of input registers configured to store input data for shifting into the array;

a column of row data selectors situated between sub-arrays configured to separate sub-arrays vertically; and a configuration controller that controls the column of row data selectors to select weights from the plurality of weight registers to apply to a remote sub-array and to select outputs generated by edge cells in the remote sub-array to apply to the plurality of output registers to configure for a smaller tile size that is a size of the remote sub-array;

wherein the configuration controller controls the column of row data selectors to select weights from computational cells in a first sub-array to apply to the remote sub-array and to select outputs generated by edge cells in the remote sub-array to apply to computational cells in the first sub-array to configure for a larger tile size that is a size that is at least a sum of sizes of the first sub-array and of the remote sub-array.

13. The neural network accelerator of claim 12 wherein the larger tile size has at least double a number of computational cells as the smaller tile size.

14. The neural network accelerator of claim 12 further comprising:

a row of column data selectors situated between sub-arrays configured to separate sub-arrays horizontally;

a configuration controller that controls the row of column data selectors to select inputs from the plurality of inputs registers to apply to a second remote sub-array and to select control bits from the plurality of control registers to apply to computational cells in the second remote sub-array to configure for the smaller tile size that is the size of the second remote sub-array;

wherein the configuration controller controls the row of column data selectors to select inputs from computational cells in the first sub-array to apply to the second remote sub-array and to select control bits from computational cells in the first sub-array to apply to the second remote sub-array to configure for the larger tile size that is a size that is at least a sum of sizes of the first sub-array and of the second remote sub-array.

15. The neural network accelerator of claim 14 wherein the pooling operations comprise:

a Rectified Linear Unit (ReLU) operation wherein an output shifted in from an adjacent cell is compared to zero and the output is cleared when the output is less than zero;

wherein only the edge cells are able to perform pooling operations while the computational cells that are no edge cells are not able to perform the pooling operations.

16. The neural network accelerator of claim 14 wherein the pooling operations comprise:

a max pooling operation wherein an output shifted in from an adjacent cell is compared to a prior maximum and the prior maximum is replaced by the output when the output is more than the prior maximum;

wherein only the edge cells are able to perform pooling operations while the computational cells that are no edge cells are not able to perform the pooling operations.

17. The neural network accelerator of claim 16 wherein the computational cells that are not edge cells are capable of performing a convolution operation but are not capable of performing a Rectified Linear Unit (ReLU) operation or a max pooling operation.

18. A dynamic-tile-size neural network accelerator comprising:

an array of computational cells arrayed into rows and columns and divided into sub-arrays;

a column of row data selectors that vertically divide the array into sub-arrays;

a row of column data selectors that horizontally divide the array into sub-arrays;

a configuration controller that activates the column of row data selectors and the row of column data selectors to bypass around a sub-array when configured for a small tile size, and to not bypass and connect adjacent cells in adjacent sub-arrays when configured for a large tile size;

a first column of edge cells in the array of computational cells, the edge cells being computational cells each with a vector mux configured to connect an output shifted in from an adjacent computational cell to an input of an adder-comparator to perform a pooling operation that pools outputs shifted in from a plurality of the computational cells;

a plurality of weight registers that are connected to the first column of edge cells to shift weights into the array;

a plurality of output registers that are connected to the first column of edge cells to receive outputs generated by the first column of edge cells that perform the pooling operation;

other first columns of edge cells in other sub-arrays, the other first columns of edge cells being connected to the column of row data selectors that connect directly to the plurality of weight registers and to the plurality of output registers when configured to bypass around the sub-array.

19. The dynamic-tile-size neural network accelerator of claim 18 further comprising:

a plurality of control registers that shift control bits into a first row of the computational cells, the control bits controlling operation of the computational cells;

a plurality of input registers that store input data that is shifted into the first row of the computational cells, the input data being multiplied by the weights shifted from the plurality of weight registers and accumulated in the computational cells when performing a convolution operation;

wherein control bits and input data are shifted downward in columns in the array;

wherein weights are right-shifted in the array;

wherein outputs are left-shifted in the array;

wherein weights and outputs are shifted in opposite directions.

20. The dynamic-tile-size neural network accelerator of claim 18 further comprising:

an adder-comparator, in each of the computational cells and in each of the edge cells, configured to add values and comparing values;

a multiplier, in each of the computational cells and in each of the edge cells, configured to multiply weights by input data;

a vector mux, in each of the edge cells and not in computational cells that are not edge cells, configured to connect an output shifted in from another computational cell to an input of the multiplier.

* * * * *